US012587226B2

(12) United States Patent
Westfield et al.

(10) Patent No.: US 12,587,226 B2
(45) Date of Patent: Mar. 24, 2026

(54) WIRELESS DISCRETE INPUT/OUTPUT WITH EXTERNAL POWER OPTION

(71) Applicant: Rosemount Inc, Shakopee, MN (US)

(72) Inventors: Brian Lee Westfield, Victoria, MN (US); Theodore Henry Schnaare, New Prague, MN (US); James Alan Johnson, Savage, MN (US); Greg Edward Gindele, Maple Lake, MN (US); Ryan Thomas Lindsey, Eden Prairie, MN (US); Jared Neuharth, Prior Lake, MN (US); Robert Weinberger, Prior Lake, MN (US)

(73) Assignee: ROSEMOUNT INC., Shakopee, MN (US)

( * ) Notice: Subject to any disclaimer, the term of this patent is extended or adjusted under 35 U.S.C. 154(b) by 611 days.

(21) Appl. No.: 17/835,514

(22) Filed: Jun. 8, 2022

(65) Prior Publication Data

US 2022/0399912 A1 Dec. 15, 2022

Related U.S. Application Data

(60) Provisional application No. 63/209,153, filed on Jun. 10, 2021.

(51) Int. Cl.
*G05B 19/042* (2006.01)
*H04B 1/38* (2015.01)

(52) U.S. Cl.
CPC ...................................... *H04B 1/38* (2013.01)

(58) Field of Classification Search
CPC ............ H04B 1/38; G05B 2219/25428; G05B 2219/31251; G05B 2219/33192; G05B 19/042
See application file for complete search history.

(56) References Cited

U.S. PATENT DOCUMENTS 2,951,980 A 9/1960 Jones et al.
3,787,678 A * 1/1974 Rainer ................... F21V 23/06
362/183

(Continued)

FOREIGN PATENT DOCUMENTS

CN 1442822 A 9/2003
CN 101576059 A 11/2009

(Continued)

OTHER PUBLICATIONS

Transmittal of the International Search Report and the Written Opinion of the International Searching Authority, or the Declaration dated Oct. 12, 2022 for International Appln. No. PCT/US2022/032776, filed Jun. 9, 2022, 11 pages.

(Continued)

*Primary Examiner* — Angelica Perez
(74) *Attorney, Agent, or Firm* — Westman, Champlin & Koehler, P.A.

(57) ABSTRACT

A wireless field device for use in an industrial process includes input/output terminals to couple to a process interface element and a discrete input/output channel to receive a discrete input signal from the process interface element when configured as a discrete input channel, the discrete input/output channel further configured to provide a discrete output to the process interface element when configured as discrete output channel. Wireless communication circuitry transmits and receives information. A controller transmits information through the communication circuitry based upon a sensed process variable, provides a discrete output signal when the discrete input/output channel is configured as a discrete output channel and receives a discrete input signal when configured as a discrete input channel. An external power supply input couples to an external power supply and a battery power supply input couples a battery.

19 Claims, 7 Drawing Sheets

(56) References Cited

U.S. PATENT DOCUMENTS

| | | | |
|---|---|---|---|
| 4,088,974 A | 5/1978 | Zhitesky et al. | |
| 4,183,241 A | 1/1980 | Fainzilberg et al. | |
| 4,198,679 A | 4/1980 | Fainzilberg | |
| 4,677,308 A | 6/1987 | Wroblewski et al. | |
| 4,691,235 A | 9/1987 | Okui et al. | |
| 4,764,868 A | 8/1988 | Ketelhut et al. | |
| 4,897,662 A | 1/1990 | Lee et al. | |
| 5,731,595 A | 3/1998 | Clark | |
| 6,795,767 B2 | 9/2004 | Nakamoto et al. | |
| 6,904,476 B2 | 6/2005 | Hedtke | |
| 6,961,624 B2 | 11/2005 | Kirkpatrick et al. | |
| 7,023,352 B2 | 4/2006 | Tseng et al. | |
| 7,035,773 B2 | 4/2006 | Keyes, IV et al. | |
| 7,039,744 B2 | 5/2006 | Mathiowetz et al. | |
| 7,154,723 B1 | 12/2006 | Warnakulasooriya et al. | |
| 7,336,068 B2 | 2/2008 | Mueller | |
| 7,447,612 B2 | 11/2008 | Keyes, IV et al. | |
| 7,636,615 B2 | 12/2009 | Pfingsten et al. | |
| 7,848,906 B2 | 12/2010 | Keyes, IV et al. | |
| 8,085,143 B2 | 12/2011 | Hollander et al. | |
| 8,149,102 B1 | 4/2012 | Miller et al. | |
| 8,344,880 B2 | 1/2013 | Seiler et al. | |
| 8,441,266 B1 | 5/2013 | Xiao et al. | |
| 8,538,732 B2 | 9/2013 | Keyes, IV et al. | |
| 8,686,596 B2 | 4/2014 | Huss et al. | |
| 8,892,034 B2 | 11/2014 | McGuire et al. | |
| 9,200,932 B2 | 12/2015 | Sittler | |
| 9,483,039 B2 | 11/2016 | Johnson et al. | |
| 2002/0169524 A1 | 11/2002 | Nakamoto et al. | |
| 2003/0171827 A1 | 9/2003 | Keyes, IV et al. | |
| 2004/0199681 A1 | 10/2004 | Hedtke | |
| 2006/0050464 A1 | 3/2006 | Von Arx et al. | |
| 2006/0052905 A1 | 3/2006 | Pfingsten et al. | |
| 2006/0142875 A1 | 6/2006 | Keyes, IV et al. | |
| 2006/0163660 A1 | 7/2006 | Jin | |
| 2006/0167644 A1 | 7/2006 | Muller | |
| 2007/0142934 A1 | 6/2007 | Boeresoek et al. | |
| 2007/0184684 A1 | 8/2007 | Bormann et al. | |
| 2007/0290788 A1 | 12/2007 | Erkens | |
| 2009/0062931 A1 | 3/2009 | Keyes, IV et al. | |
| 2009/0212975 A1 | 8/2009 | Ausman et al. | |
| 2009/0315725 A1 | 12/2009 | Hollander et al. | |
| 2010/0318229 A1 | 12/2010 | Kaszkin et al. | |
| 2011/0134973 A1 | 6/2011 | Keyes, IV et al. | |
| 2011/0140902 A1 | 6/2011 | Huss et al. | |
| 2013/0009472 A1 | 1/2013 | Orth | |
| 2013/0278395 A1* | 10/2013 | Johnson | G05B 19/0423 340/12.5 |
| 2013/0319074 A1 | 12/2013 | Sittler | |
| 2013/0344818 A1 | 12/2013 | McGuire et al. | |
| 2015/0002185 A1* | 1/2015 | McGuire | G01R 31/40 324/764.01 |
| 2015/0231974 A1* | 8/2015 | Yunoue | E02F 3/325 307/10.1 |
| 2022/0399912 A1 | 12/2022 | Westfield et al. | |

FOREIGN PATENT DOCUMENTS

| | | | |
|---|---|---|---|
| CN | 101995336 A | 3/2011 | |
| CN | 202794900 U | 3/2013 | |
| JP | S62-107301 A | 5/1987 | |
| JP | S62173580 A | 7/1987 | |
| JP | 5-204417 A | 8/1993 | |
| JP | 5-346809 A | 12/1993 | |
| JP | 7-336906 | 12/1995 | |
| JP | H08148202 A | 6/1996 | |
| JP | 2002-333901 A | 11/2002 | |
| JP | 2004064127 A | 2/2004 | |
| JP | 2006522412 A | 9/2006 | |
| JP | 2007012594 A | 1/2007 | |
| JP | 2009043505 A | 2/2009 | |
| JP | 2009-080741 A | 4/2009 | |
| JP | 2011160502 A | 8/2011 | |
| JP | 2012-070486 | 4/2012 | |
| JP | 2012-196839 | 10/2012 | |
| JP | 2015109207 A | 6/2015 | |
| JP | 2015521290 A | 7/2015 | |
| JP | 2015-142396 | 8/2015 | |
| JP | 2015527645 A | 9/2015 | |
| JP | 2016-073102 | 5/2016 | |
| RU | 2278357 C2 | 6/2006 | |
| WO | 2013/0009472 | 10/2013 | |
| WO | WO-2015034559 A1 * | 3/2015 | G01D 21/00 |
| WO | 2018182688 A1 | 10/2018 | |
| WO | 2019/182688 | 9/2019 | |

OTHER PUBLICATIONS

Rosemount, Rosemount 702 Wireless Discrete Transmitter, Dec. 13, 2012, http://www2.emersonprocess.com/siteadmincenter/PM Rosemount Documents/00813-0100-4702.pdf.

Invitation to Pay Additional Fees, and Where Applicable, Protest Fee dated Jul. 16, 2013 for International Appln. No. PCT/US2013/029491, filed Mar. 7, 2013.

Transmittal of the International Search Report and the Written Opinion of the International Searching Authority, or the Declaration dated Sep. 13, 2013 for International Appln. No. PCT/US2013/029491, filed Mar. 7, 2013. 16 pgs.

Communication pursuant to Rules 161(1) and 162 EPC for European Patent Application No. 13713268.4-1802, dated Dec. 5, 2014, 2 pages.

Office Action from Chinese Patent Application Serial No. 201210282403.0, dated Jan. 29, 2015.

Office Action from Australian Patent Application Serial No. 2013249848, dated Mar. 17, 2015.

Office Action from Chinese Patent Application Serial No. 201210282403.0, dated Jul. 6, 2015.

Office Action from Australian Patent Application Serial No. 2013249848, dated Oct. 8, 2015.

Communication Under Rule 164(2)(a) EPC from European Patent Application Serial No. 13713268.4, dated Aug. 3, 2015.

Communication Pursuant to Rule 164(2)(b) and Article 94(3) from European Patent Application Serial No. 13713268.4, dated Sep. 22, 2015.

Examiner's Report from Canadian Patent Application No. 2866157, dated Nov. 30, 2015.

Office Action from Japanese Patent Application No. 2015-506989, dated Nov. 24, 2015.

Office Action from Russian Patent Application No. 2014146298, dated Jan. 13, 2016.

Examination Report from Indian Patent Application No. 1841/MUMNP/2014, dated Feb. 7, 2019.

Communication pursuant to Rules 161(1) and 162 EPC dated Jan. 17, 2024, for corresponding European Application No. 22735736.5, 3 pages.

Communication Pursuant to Article 94(3) EPC for corresponding European Application No. 22 735 736.5-1201, dated Dec. 4, 2024, 7 pages.

Translation of Japanese Office Action for corresponding Japanese Application No. 2023-576168, dated Dec. 17, 2024, 13 pages.

First Canadian Office Action for corresponding Canadian Application No. 3,220,876, dated Oct. 8, 2024, filed Nov. 29, 2023.

Office Action from corresponding Japanese Application No. 2023-576168, dated Jun. 17, 2025.

Communication Pursuant to Article 94(3) EPC for corresponding European Patent Application No. 22 735 736.5-1201, dated Oct. 29, 2025, 4 pages.

Decision of Refusal and Decision of Dismissal of Amendment from corresponding Japanese Application No. 2023-576168, dated Nov. 18, 2025.

Examination Report from from corresponding Indian Application No. 202327078467, dated Jan. 9, 2026.

Hearing Notice from corresponding Indian Application No. 202327078467, dated Feb. 17, 2026.

* cited by examiner

WIRELESS DISCRETE INPUT/OUTPUT WITH EXTERNAL POWER OPTION

CROSS-REFERENCE TO RELATED APPLICATION

The present application is based on and claims the benefit of U.S. provisional patent application Ser. No. 63/209,153, filed Jun. 10, 2021, the content of which is hereby incorporated by reference in its entirety.

BACKGROUND

The present invention relates to field devices of the type used to control or monitor industrial processes. More specifically, the present invention relates to an industrial process field device having a discrete input and a discrete output channels.

Industrial processes are employed in the monitoring or manufacturing of process materials and fluids such as oil, paper pulp, etc. In order to monitor operation of an industrial process, process variable transmitters are employed. The process variable transmitters measure process variables and transmit the process variable information to a centralized location. Example process variables include flow rate, temperature, pressure, fluid level, etc. The process variable transmitter is one example of a field device. Another example field device is a controller. The controller is used to control operation of the process by actuating a control element. For example, the controller can adjust the position of a valve, change the speed of a pump, change the temperature of a heating element, etc. The controller may receive its instructions from a centralized location.

One type of field device is a discrete Input/Output (I/O) device. A discrete I/O, or DIO, device typically includes multiple input and/or output channels. The input channels can be used, for example, to detect the closure of a switch such as a liquid level switch. The output channels can be used, for example, to control an external load.

Typically, field devices rely on wired communication to a central location. Example wired communication techniques include two-wire process control loops in which both power and information are carried on the same two wires. However, more recently wireless communication techniques have been employed with field devices. One example wireless communication technique is set forth in the Wireless HART® communication protocol in accordance with the IEC 2591 Standard. However, wireless field devices that rely on battery power for operation may be limned in providing certain functionality without significant reduction in battery life.

SUMMARY

A wireless field device for use in an industrial process includes input/output terminals configured to couple to a process interface element and a discrete input/output channel configured to receive a discrete input signal from the process interface element through the input/output terminals when configured as a discrete input channel. The discrete input/output channel could also be configured to provide a discrete output to the process interface element through the input/output terminals when configured as discrete output channel. Wireless communication circuitry is configured to transmit and receive information. A controller is configured to transmit information through the wireless communication circuitry based upon a process variable sensed using the process interface element, provide a discrete output signal to the process interface element to control a process variable in response to information received by the wireless communication circuitry when the discrete input/output channel is configured as a discrete output channel. The discrete input/output channel can also receive a discrete input signal from a process variable sensor and responsively provide an output using the wireless communication circuitry when the discrete input/output channel is configured as a discrete input channel. An external power supply input is configured to couple to an external power supply and a battery power supply input is configured to couple a battery, to power supply circuitry coupled to the external power supply input and the battery power supply input has a power output which powers the controller from at most one of the external power supply or the battery.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the Background.

DETAILED DESCRIPTION OF ILLUSTRATIVE EMBODIMENTS

Figure 1:
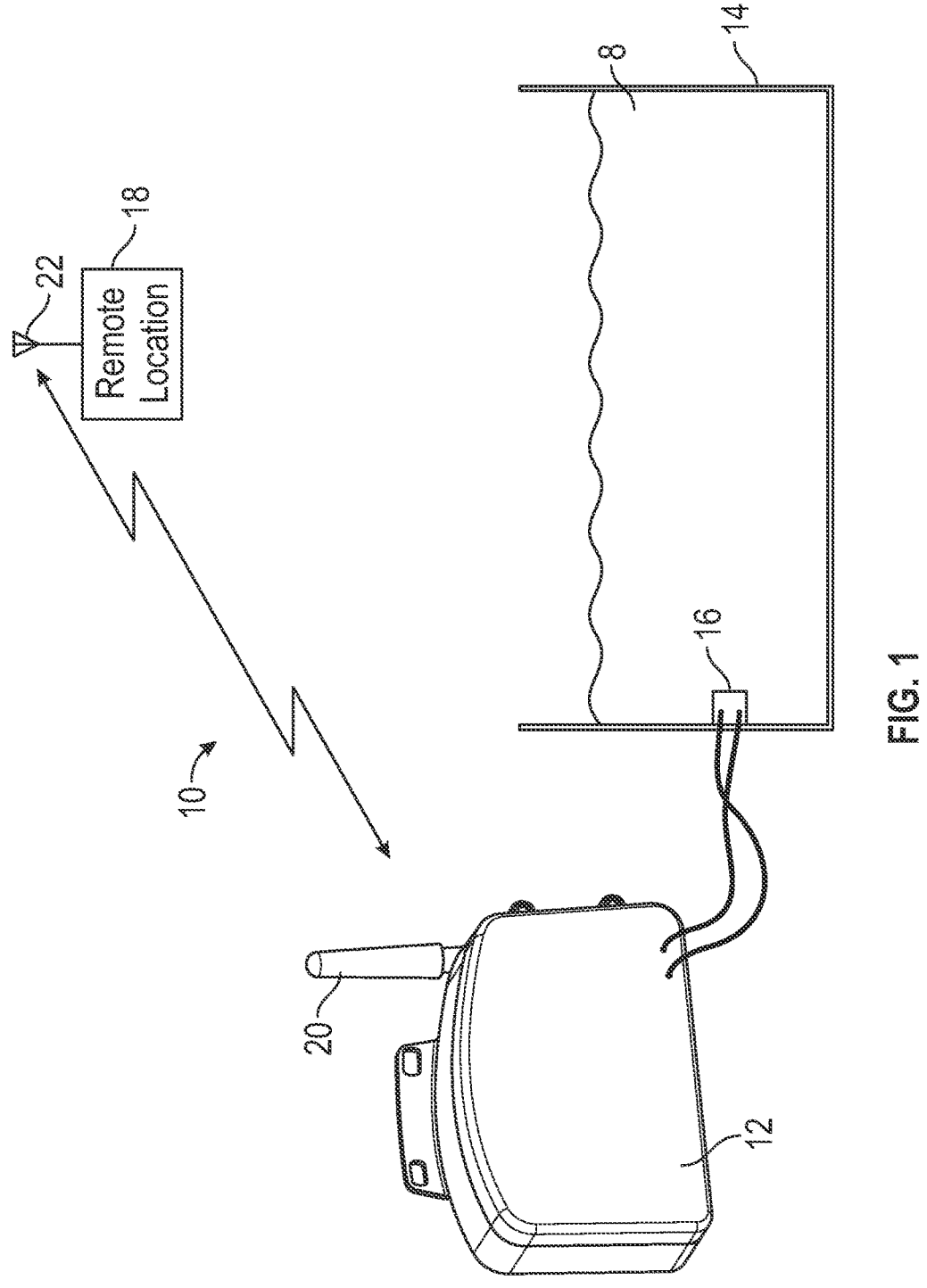
FIG. 1 is a simplified diagram of an industrial process control system including a discrete input/output (DIO) field device.

Embodiments of the present disclosure are described more fully hereinafter with reference to the accompanying drawings. Elements that are identified using the same or similar reference characters refer to the same or similar elements. Some elements may not be shown in each of the figures in order to simplify the illustrations. The various embodiments of the present disclosure may be embodied in many different forms and should not be construed as limited to the specific embodiments set forth herein. Rather, these embodiments are provided so that this disclosure will be thorough and complete, and will fully convey the scope of the present disclosure to those skilled in the art.

There is an increasing demand for wireless Direct Input/Output (DIO) field devices to deliver more functionality and at faster update rates on more I/O channels. The addition of more channels and increased functionality comes at the expense of reduced battery life. For users that are not willing to make the tradeoff between increased performance and more frequent battery changes, an external power option can be provided.

There is a need for providing flexibility for multiple types of operating power connections for wireless transmitter devices. Generally, these devices will be powered by a primary lithium cell power module for simple wireless convenience. However, in particular applications, it is desirable to provide an option for an external, wired power connection when higher operating power is needed. However, if an external connection is chosen by the user, the power module and related circuitry should not be allowed to be part of the same electrical circuit as the external power. If this occurs, the external power supply could damage internal circuitry of the field device and also lead to damage to any connected power module. This issue could occur if there are any other sources of power being supplied to the power module terminals.

A multi-channel wireless DIO controller (field device) with expanded capability to operate on either a battery power module or external DC power source is provided. This configuration provides an efficient means of incorporating an external DC power option to a battery powered DIO, while maintaining intrinsic safety. The external power option provides the DIO with improved device performance and allows it to control loads with higher power requirements without using separate power sources.

In one aspect, an input power isolation slider mechanism provides an operating power option for only one of a power module or a directly wired power connection for wireless measurement transmitter devices. This slider mechanism prevents power being applied to both power inputs at the same time. Once the power option is chosen and the slide mechanism is in the desired position, the user will not be able to have both power options engaged at the same time. This prevents the possibility of applying electrical energy to the primary cell power module which could lead to damage of the power module and potentially to a dangerous condition. This invention provides an exclusive choice not only mechanically, but can also provide redundancy with switches or other means of providing an exclusive electrical connection.

The addition of an external power option to a wireless DIO (discrete input output) device set forth herein expands the capability and performance of the device. The external power option allows any number of DIO channels to be operated at faster update rates as the device is not constrained by battery capacity. The additional power also enables the use of more sophisticated control algorithms (such as ladder logic) for local DIO control applications in the field. The use of external power also allows for controlling high power loads for extended periods which could otherwise lead to unacceptably short power module life. This embodiment shows the use of 8 DIO channels, however any number of DIO channels can be supported. This concept supports the use of either battery or external power options while maintaining intrinsic safety.

The field device set forth herein is capable of receiving a discrete input from a sensor in an industrial process related to a process variable. The sensor is coupled to terminals of the field device. Further, the terminals of the field device can be configured to provide a discrete output to a discrete control element in the process. This allows the same two terminals to be configured for use in sensing a process variable as well as for controlling a process variable, as desired. The field device is configured for wireless communication to a remote location. The wireless communication can be in accordance with any appropriate technique such as, for example, the Wireless HART® communication protocol in accordance with the IEC 62591 Standard.

FIG. 1 is a simplified block diagram of an industrial process 10 including a wireless DIO field device 12 coupled to a process vessel or tank 14. The process vessel can carry a process fluid 8. The wireless DIO field device 12 includes a discrete process interface element 16 which may comprise a control element if the device is configured to provide a discrete control output signal, or can comprise a process variable sensor if the field device 12 is configured to sense a process variable from a discrete process variable sensor. If configured to sense a process variable, the field device 12 can wirelessly communicate information related to the sensed process variable to a remote location 18 through antennas 20 and 22. The remote location 18 can comprise, for example, a central location such as a control room. Examples of a discrete process variable sensor include a switch which changes state when a particular event happens, such as a temperature threshold is exceeded or a level threshold is exceeded. Another type of discrete process variable sensor provides a series of pulses which are related to a sensed process variable which can be counted. Examples of such process variable sensors include turbine flow meter and magnetic flow meter pulse outputs. The field device 12 can also be configured to provide a control output. In one example of such a configuration, information is received from the remote location 18 which is used to responsively provide the control output. Examples of discrete control elements which can be controlled by device 12 include motors, actuators, solenoids, resistive elements among others.

Figures 2A, 2B, 2C:
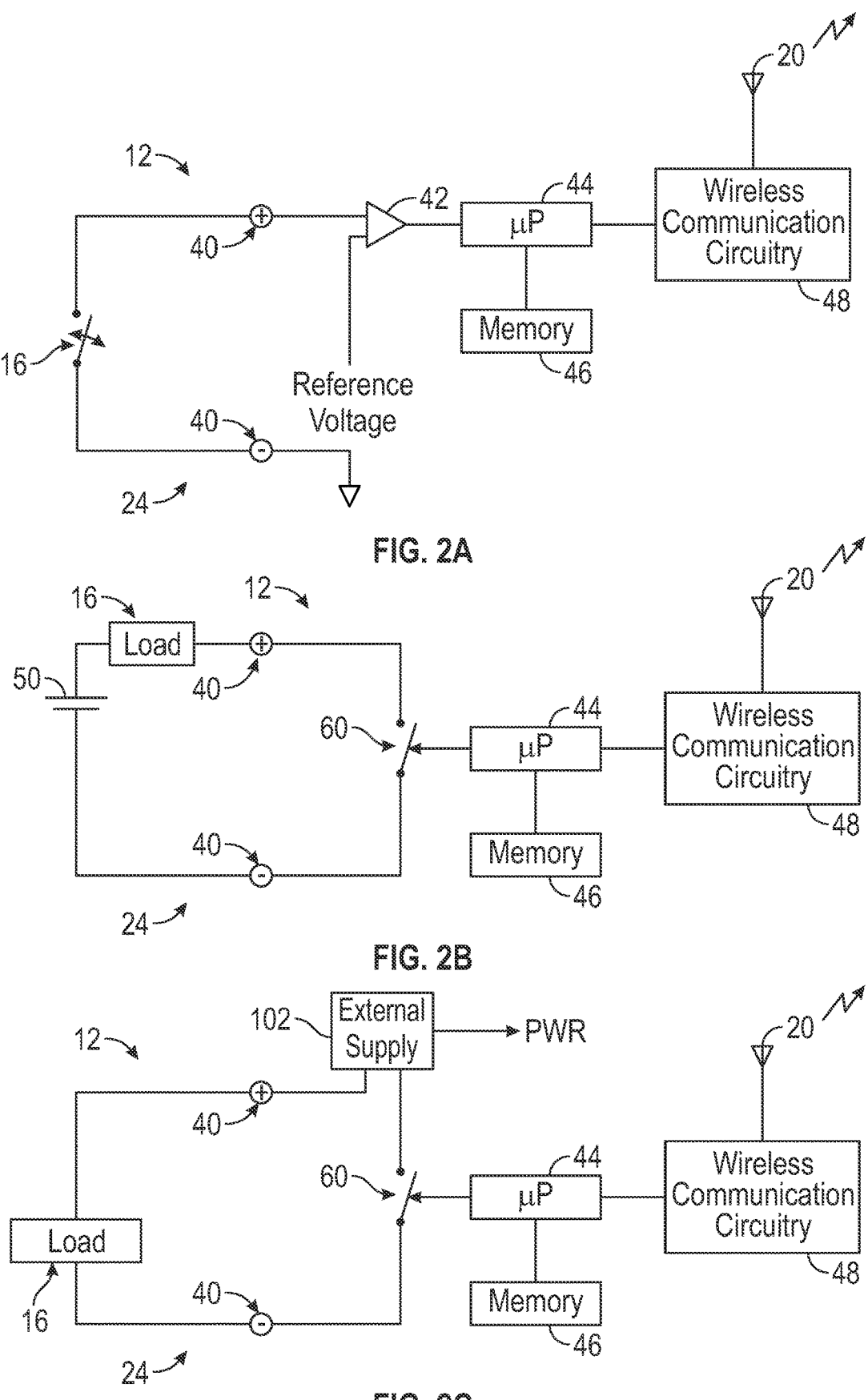
FIG. 2A illustrates a discrete input/output channel of the field device of FIG. 1 configured as an input channel.
FIG. 2B illustrates a discrete input/output channel of the field device of FIG. 1 configured as an output channel.
FIG. 2C illustrates a discrete input/output channel of the field device of FIG. 1 configured as an output channel and utilizing an external power supply.

FIG. 2A is a simplified block diagram of field device 12 having a channel 24 configured to receive an input from a discrete process variable sensor. In FIG. 2A, the process interface element 16 is illustrated as a two-position (opened and closed) switch. For example, the interface element 16 can comprise a level switch responsive to the level of process fluid 8 carried in tank 14 illustrated in FIG. 1. The switch connects to input/output terminals 40 of the field device 12. One of the terminals 40 connects to a comparator 42 which also receive a reference voltage. For example, if the switch 16 is closed, a high output is provided to a microprocessor 44 whereas if the switch 16 is open, a low output is provided. The microprocessor 44 receives the output from the comparator 42 and operates in accordance with instructions stored in a memory 46. Based upon the received input, the microprocessor 44 can communicate wirelessly using wireless communication circuitry 48 and antenna 20.

FIG. 2B shows an alternative configuration of DIO channel 24 of field device 12. Channel 24 is coupled to a discrete control element. In FIG. 2B, the process interface element 16 is illustrated as a load which is connected to a voltage source 50. For example, the load 16 may be a relay, a valve actuator, etc. In FIG. 2B, the load 16 and voltage source 50 are coupled to the input/output terminals 40 of the field device 12. Rather than using a comparator 42, in the configuration of FIG. 2B the field device 12 couples a switch 60 to voltage source 50 through terminals 40. The switch 60 operates under the control of microprocessor 44. FIG. 2A illustrates the device 12 configured to provide an input channel, whereas FIG. 2B illustrates the device configured to provide an output channel.

FIG. 2C shows another example configuration of DIO channel 24 of field device 12. In this configuration the channel 24 couples to an external power supply 102 which is used to provide power to load 16. This external power supply 102 is a common power supply and is also used to provide power to circuitry of the field device such as microprocessor 44, memory 46 and wireless communication circuitry 48.

The configuration of field device 12 which is illustrated in FIGS. 2A and 2B can be problematic in some environments. For example, if field device 12 is simultaneously coupled to an external power source 50 or 102 as well as a battery power source, currents or voltages may be introduced into the circuitry of the field device 12 thereby damaging the circuitry or other components. This may cause the circuitry to completely fail or may cause the circuitry to partially fail, for example, introducing errors in subsequent measurements or control signals. Additionally, the device 12 should be configured to operate in an "intrinsically safe" manner in which the device is not capable of causing damage to other components in the industrial process or its surroundings.

Figure 3:
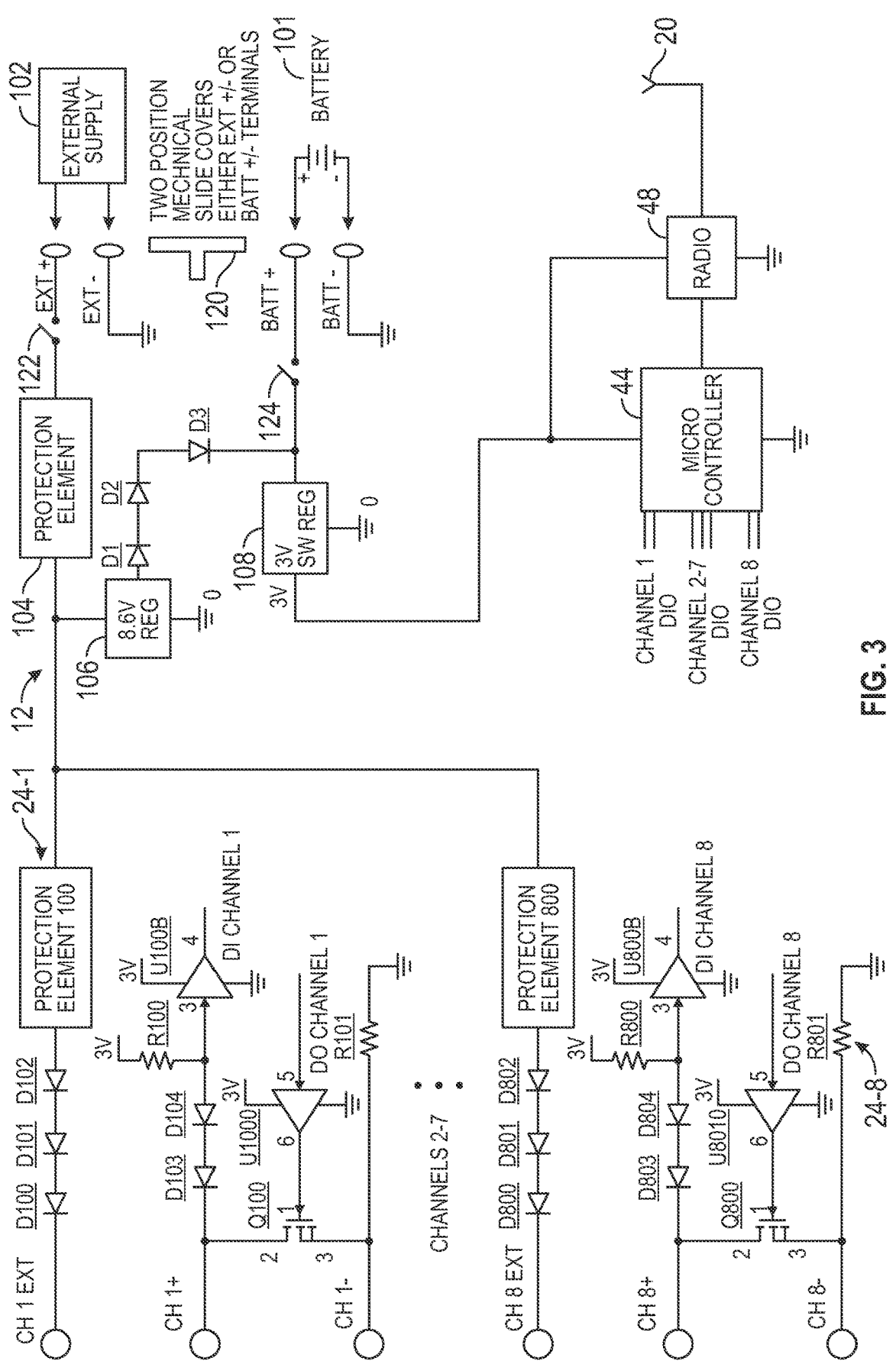
FIG. 3 is a simplified schematic diagram showing the discrete input/output field device of FIG. 1 including eight input and output channels along with an external power supply and battery connection.

FIG. 3 is a more detailed schematic diagram of the circuitry of field device 12. In FIG. 3, eight channels 24-1 to 24-8 are illustrated which operate as either input or output channels as desired. For illustrative purposes only, channel 24-1 will be discussed specifically. In channel 24-1, three input/output connections are provided: CH1 EXT, CH1+ and CH1−. Protection diodes D100, D101 and D102 are provided for intrinsic safety. In battery powered mode (discussed below in more detail) the CH1+ and CH1− connections are used for both input and output terminals. To provide a switch closure, transistor Q100 is closed using the DO CHANNEL 1 input connection through U1000. To operate as an input channel, operation amplifier U100B couples to the CH1+ input and provides an output DI CHANNEL 1 to microprocessor 44.

When connected to an external power supply, the channel 24-1 has an additional operational mode in which it can provide power to an external component such as load 16 shown in FIG. 2B. In this configuration, the external load is electrically connected between CH1EXT and CH1+. The applied voltage is adjustable by controlling the voltage of the external supply as desired.

As illustrated in FIG. 3 two optional power supplies are provided in the form of a battery 101 or an external power supply 102. External power supply 102 connects to external connections EXT+ and EXT− and similarly battery 101 connects to battery connections BATT+ and BATT−. A protection element 104 is provided to protect internal circuitry and an 8.6 voltage regulator 106 steps down the voltage supplied by the external power supply 102 and provides power through diodes D1, D2 and D3 to a switching regulator 108. Diodes D1-3 provide intrinsic safety protection to the device. Power from the external supply 102 is coupled to the CH1EXT channel through diodes D100-D102, protection element 100 and protection element 104. A three volt output from regulator 108 is provided to power the microcontroller 44 and wireless communication circuitry (radio 48). This is also used to provide power to components in the input/output channels 24-1 . . . 24-8. Microcontroller 44 receives inputs from and provides outputs to discrete input/output channels 24-1 . . . 24-8.

A slidable (moveable) two position cover 120 blocks either terminals EXT+ and EXT− or terminals BATT+ and BATT− to prevent an operator from inadvertently connecting an external power supply 102 and a battery 101 to the device at the same time. This prevents potential damage to internal circuitry of the device or damage to the battery 101. Optional switches 122 and 124 can be coupled to the operation of sliding cover 120 to provide a disconnect between the external supply 102 and the battery 101 based upon the position of the cover 120 to provide additional protection of internal circuitry.

Figure 4:
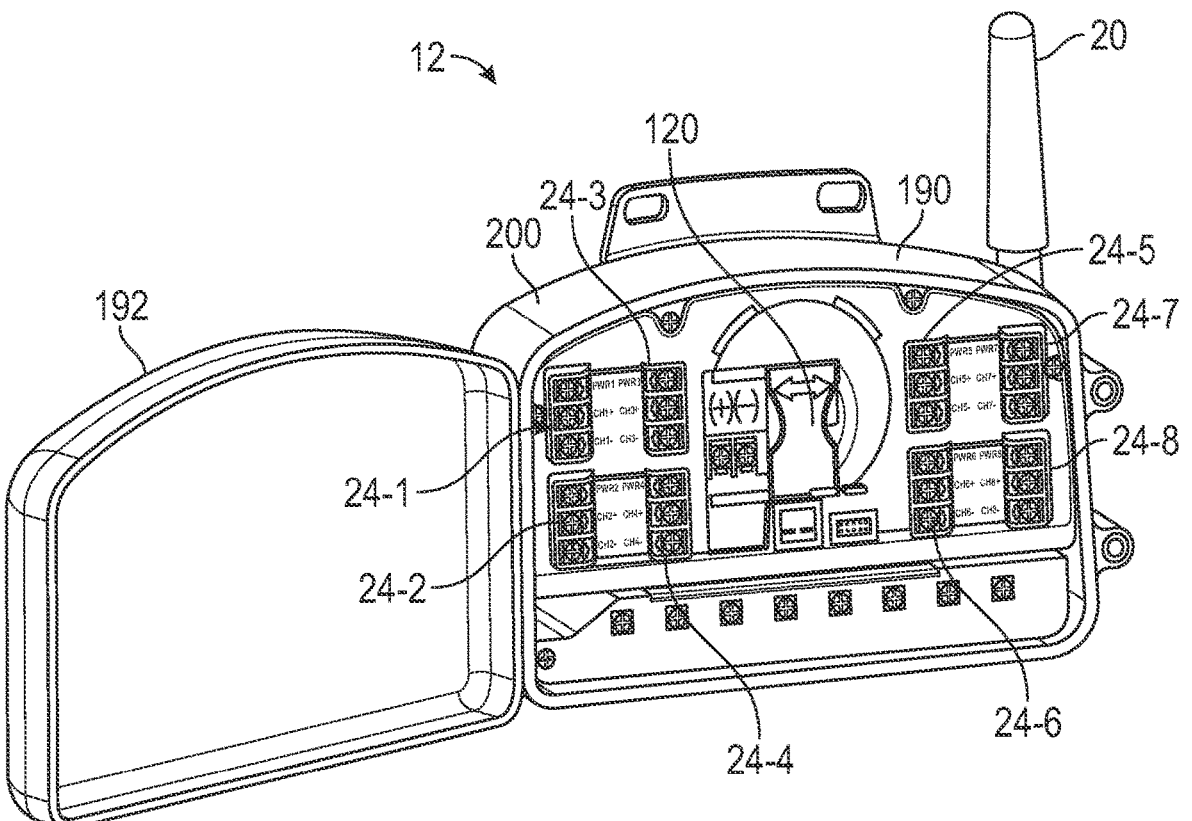
FIG. 4 is a perspective view of discrete input/output device.

FIG. 4 is a perspective view of wireless field device 12 showing a housing body 190 and a cover 192. FIG. 4 illustrates the various channel connections 24-1 . . . 24-8 along with slidable (moveable) two position cover 120.

Figures 5A, 5B:
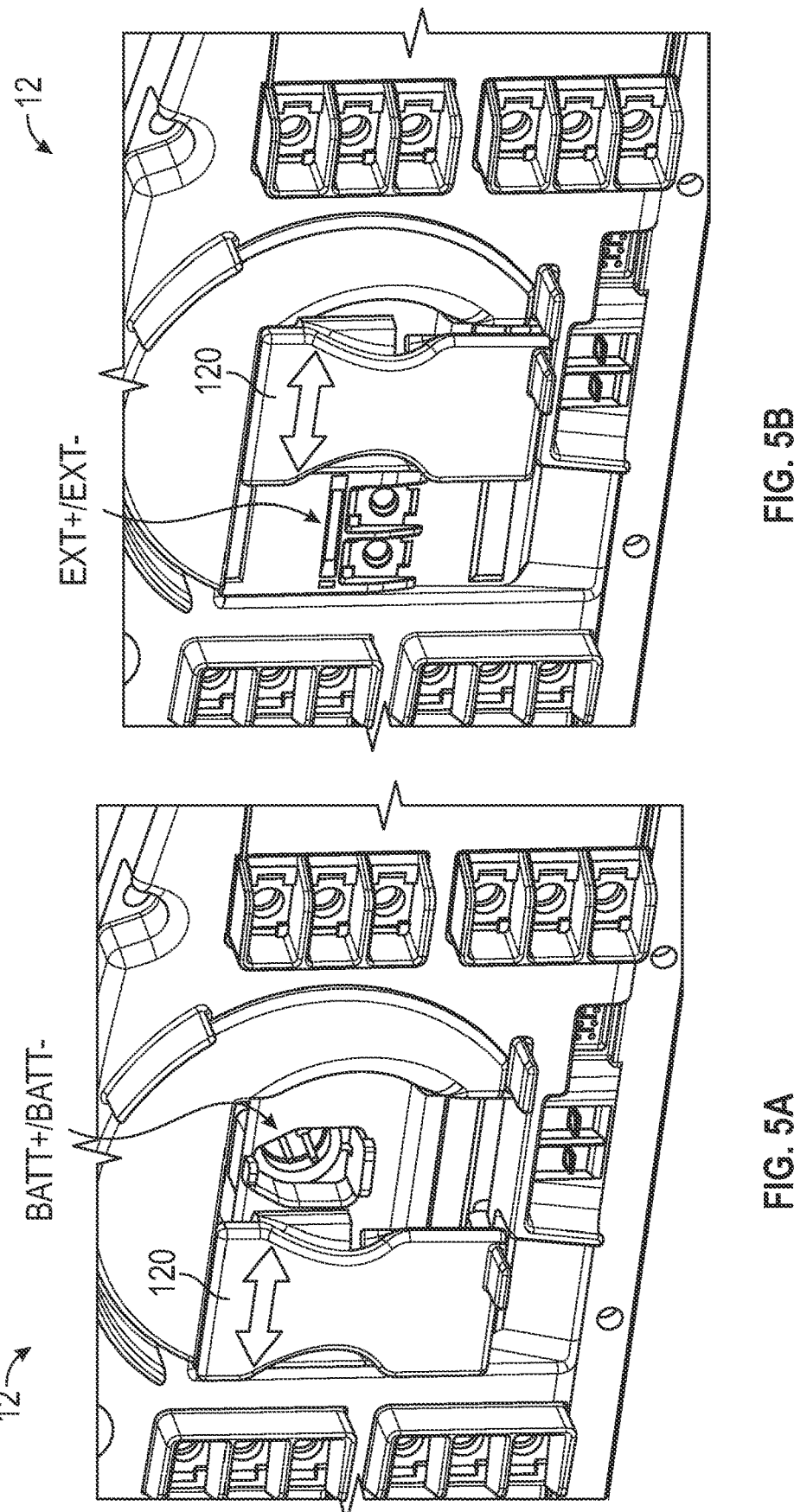
FIG. 5A is a perspective view of the discrete input/output wireless device having a slidable (moveable) cover in a first position in which connections for a battery are exposed.
FIG. 5B is a perspective view of the discrete input/output wireless device having a slidable (moveable) cover in a second position in which connections to an external power source are exposed.
Figure 6:
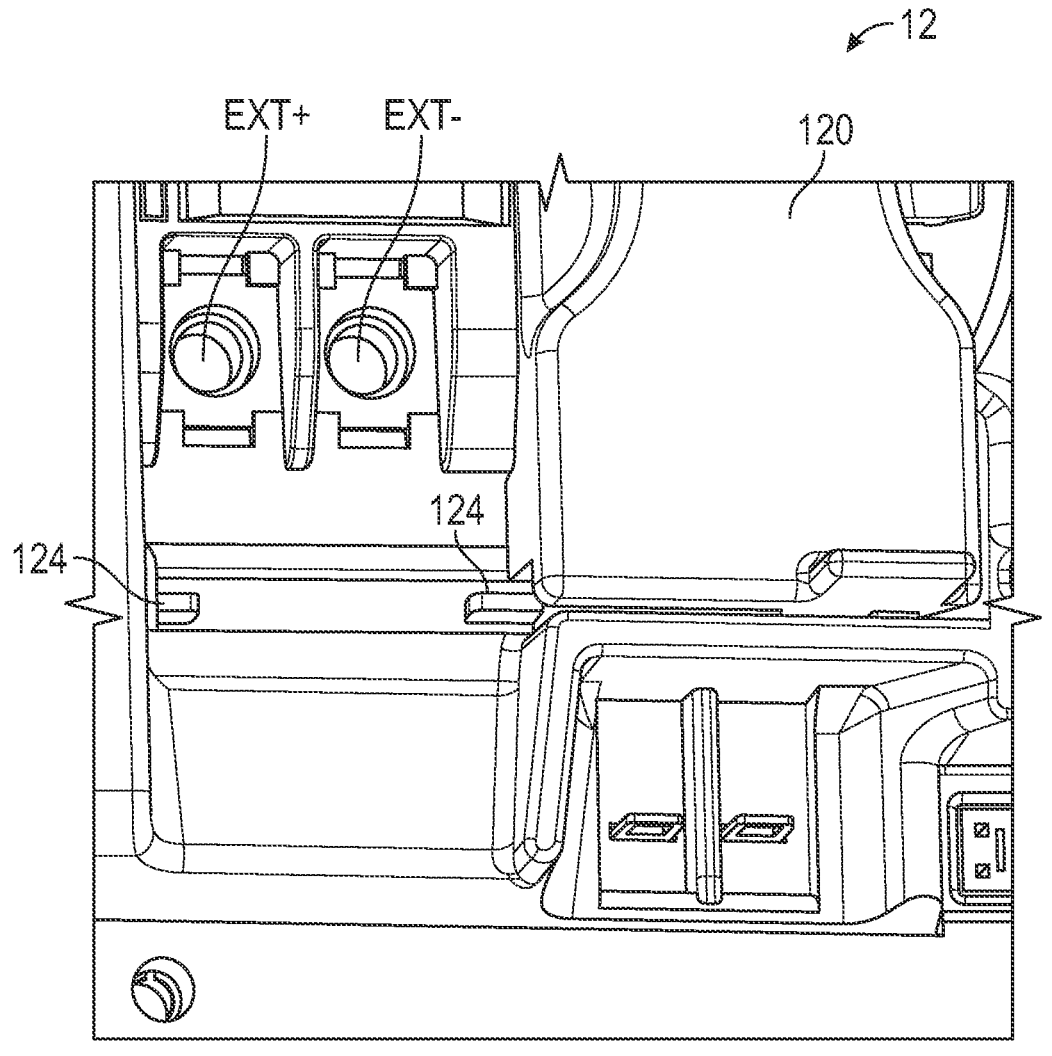
FIG. 6 is an enlarged view of a portion of the discrete input/output wireless field device including an optional switch for electrically connecting an external power source to circuitry of the device.

FIG. 5A is a perspective view of device 12 showing cover 120 in a first position in which BATT+ and BATT− connections are exposed. Similarly, FIG. 5B shows cover 120 in an alternate position in which the EXT+ and EXT− connections are exposed. FIG. 6 is an enlarged view of device 12 showing operation of switch 124. As illustrated in FIG. 6, in the position of cover 120, switch 124 is open whereas the opposed switch 122 (not shown in FIG. 6) is closed providing an electrical connection to external power supply terminals EXT+ and EXT−.

Figure 7:
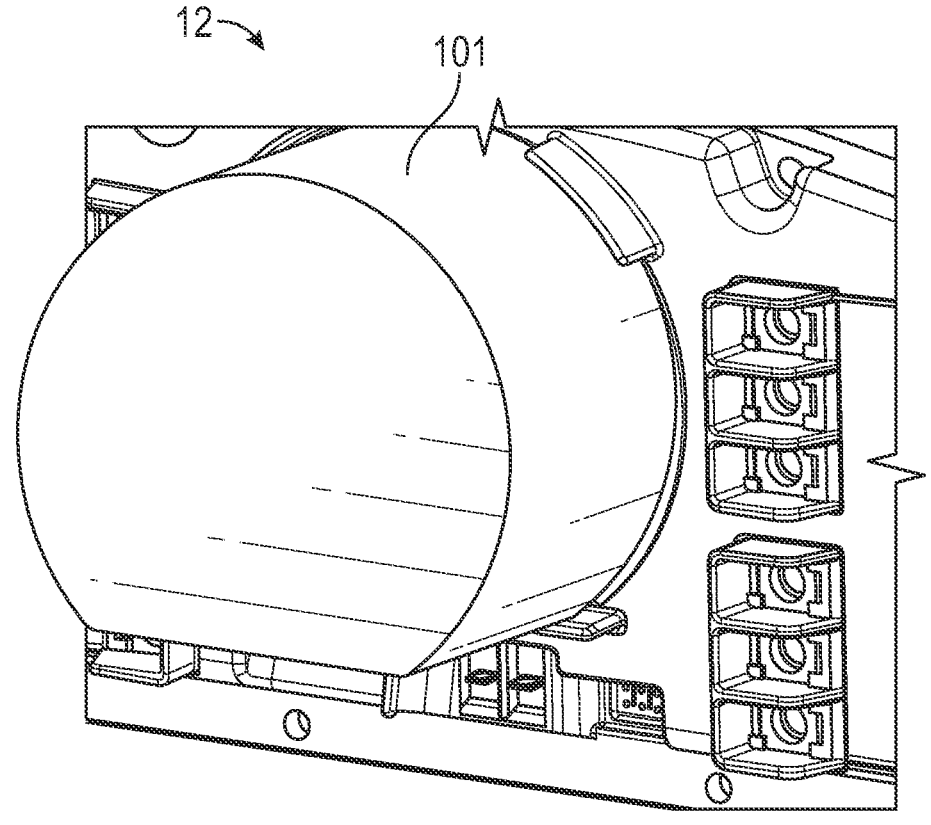
FIG. 7 is a perspective view of the discrete input/output field device including a battery module connected to the device.

FIG. 7 illustrates a battery 101, configured as a battery power module, plugged into the BATT+ and BATT− connectors of the device 12. This can be of a standardized configuration or can be a customized arrangement as desired. The battery power module can be configured to plug into a housing of the wireless field device.

The circuit set forth herein consists of 8 identical DIO control blocks and two power options. The circuit can be operated using either a battery or external voltage source. The use of both power sources at the same time is not permitted. The circuit receives power from either a battery across its Batt+/− terminals or external power source across its Ext+/− terminals. A mechanical sliding cover is incorporated into the design to physically allow access to only one power option at a time. The use of a mechanical slide or other moveable component greatly reduces the circuitry otherwise required to protect the battery when using an external supply.

In battery power mode, access to the external power terminals is blocked by the mechanical slide. The battery supplies power to the input of the 3V regulator that is used to operate the device electronics. Protection diodes D1, D2 & D3 provide isolation from the external power circuit for intrinsic safety purposes. In this operating mode, channel connections for both DI & DO use the CH x− and CH x+ terminals.

In external power mode, access to the battery terminals is blocked by the mechanical slide. The external supply performs two functions. It provides input power to an 8.6V pre-regulator for the purpose of powering the device electronics and as an internal power option for driving DO loads on a third lug (Ch x Ext). In this operating mode, channels configured as DI's operate the same as in battery powered mode and connect between CH x− and CH x+ terminals. Channels configured as discrete output channels have two options for driving loads. For applications where a DO device contains its own power source, it will be connected between the Ch x− and Ch x+ terminals. Operation of DO channel in this mode is the same as in battery powered mode. For DO devices that require a voltage source to operate, the internal power supply option can be used. In this configuration, The DO load is connected between the Ch x Ext and Ch x+ terminals. Protective elements in series with the third lug on each channel guard against misuse and provide intrinsic safety. The voltage on this terminal is adjustable at the external supply for use in any application. The third lug provides a streamline connection method for powering multiple DO loads.

This Multi-Channel Wireless DIO with external power circuit offers several advantages over a battery only powered device. The configuration supports the addition of more DIO channels and the ability to operate them faster. The external power option also provides the user with a convenient means of driving DO loads using the internal supply option. The circuit also accommodates control of DO devices requiring power on a separate pair of terminals. The circuit incorporates the use of a mechanical slide to reduce the circuitry required to achieve intrinsic safety.

This invention solves the problem by both providing the convenience and flexibility of the two operating power input power terminals and also isolating the two connections from the possibility of being part of the same circuit at the same time. The mechanical isolation is provided with a sliding mechanism which always covers one of the operating power connections. This slider provides full coverage of the external wire terminals when in the power module option position. It also blocks the power module terminals when in the external wire terminal option position thereby preventing a battery power module from being installed.

Along with this mechanical isolation, this invention provides an option for a switch or set of switches to be used to close only one selected power input circuit when the slider mechanism is in either its final positions. This will disengage the opposing circuit while the mechanism is also mechanically blocking the opposing unused power option terminals.

Although the present invention has been described with reference to preferred embodiments, workers skilled in the art will recognize that changes may be made in form and detail without departing from the spirit and scope of the invention. Voltage level on the third lug can be made programmable for each channel. The external power option can support an AC source. Full channel-to-channel and/or power supply isolation can be added for the external power option. This can be utilized with any type of wireless device in which it is desirable to provide external operational power terminals and is not limited to the discrete input/output device set forth herein.

What is claimed is:

1. A wireless field device for use in an industrial process, comprising:
   input/output terminals configured to couple to a process interface element;
   a discrete input/output channel configured to receive a discrete input signal from the process interface element through the input/output terminals when configured as a discrete input channel, the discrete input/output channel further configured to provide a discrete output to the process interface element through the input/output terminals when configured as a discrete output channel;
   wireless communication circuitry configured to transmit and receive information;
   a controller configured to:
      transmit information through the wireless communication circuitry based upon a process variable sensed using the process interface element;

provide a discrete output signal to the process interface element to control a process variable in response to information received by the wireless communication circuitry when the discrete input/output channel is configured as a discrete output channel;
   receive a discrete input signal from a process variable sensor and responsively provide an output using the wireless communication circuitry when the discrete input/output channel is configured as a discrete input channel;
   an external power supply input configured to couple to an external power supply;
   a battery power supply input configured to couple to a battery;
   a two position moveable cover which covers at most one of the external power supply input and the battery power supply input; and
   power supply circuitry coupled to the external power supply input and the battery power supply input having a power output which powers the controller from at most one of the external power supply or the battery to thereby electrically isolate the external power supply module from the battery, wherein the power supply circuitry is responsive to a position of the moveable cover to connect the power supply circuitry to one of the external power supply input and the battery power supply input.

2. The wireless field device of claim 1 including a switch configured to selectively disconnect the external power supply input from the power supply circuitry.

3. The wireless field device of claim 2 wherein the switch is actuated by a moveable cover which covers at most one of the external power supply input and the battery power supply input.

4. The wireless field device of claim 1 including a switch configured to selectively disconnect the battery power supply input from the power supply circuitry.

5. The wireless field device of claim 4 wherein the switch is actuated by the a-moveable cover which covers at most one of the external power supply input and the battery power supply input.

6. The wireless field device of claim 1 including a first switch configured to selectively connect the external power supply input and the power supply circuitry and a second switch configured to selectively connect the battery power supply to the power supply circuitry.

7. The wireless field device of claim 6 including the moveable cover moveable between a first position in which the battery power supply input is exposed and a second position in which the external power supply input is exposed and wherein the moveable cover actuates the first and second switches to disconnect the external power supply input from the power supply circuitry and connect the battery power supply input to the power supply circuitry when in the first position.

8. The wireless field device of claim 6 including the moveable cover moveable between a first position in which the battery power supply input is exposed and a second position in which the external power supply input is exposed and wherein the moveable cover actuates the first and second switches to disconnect the battery power supply input from the power supply circuitry and connect the external power supply input to the power supply circuitry when in the second position.

9. The wireless field device of claim 1 including a step down supply configured to step down a voltage from the external power supply applied to the power supply circuitry.

10. The wireless field device of claim 1 including intrinsic safety circuitry coupled to the external power supply input.

11. The wireless field device of claim 10 wherein the intrinsic safety circuitry comprises three diodes connected in series.

12. The wireless field device of claim 1 wherein the discrete input/output channel includes a switch configured to be actuated by the controller, the switch configured to selectively electrically couple the discrete input/output terminals together.

13. The wireless field device of claim 1 including at least three diodes connected in series with the input/output terminals to provide protection to circuitry of the wireless field device.

14. The wireless field device of claim 1 wherein the discrete input/output channel includes a negative terminal and a positive terminal configured to sense a switch closure when configured as a discrete input channel and configured to provide an electrical connection between the negative terminal and the positive terminal when configured as a discrete output channel.

15. The wireless field device of claim 14 wherein the discrete input/output channel further includes a powered output connection electrically connected to the external power supply.

16. The wireless field device of claim 15 wherein the powered output connection is configured to apply power to an external device when the discrete input/output channel is configured as a discrete output channel.

17. The wireless field device of claim 16 wherein the voltage applied by the powered output channel is controllable by controlling the voltage of the external power supply.

18. The wireless field device of claim 1 wherein the battery is carried in a battery module configured to plug into a housing of the wireless field device and couple to the battery power supply input.

19. The wireless field device of claim 1 including a plurality of discrete input/output channels.

* * * * *